March 28, 1939. A. E. BOWYER-LOWE 2,151,891
AUTOMATIC GRAMOPHONE AND THE LIKE
Filed Sept. 14, 1937 11 Sheets-Sheet 1

Albert Edwin Bowyer-Lowe
INVENTOR his ATTY.

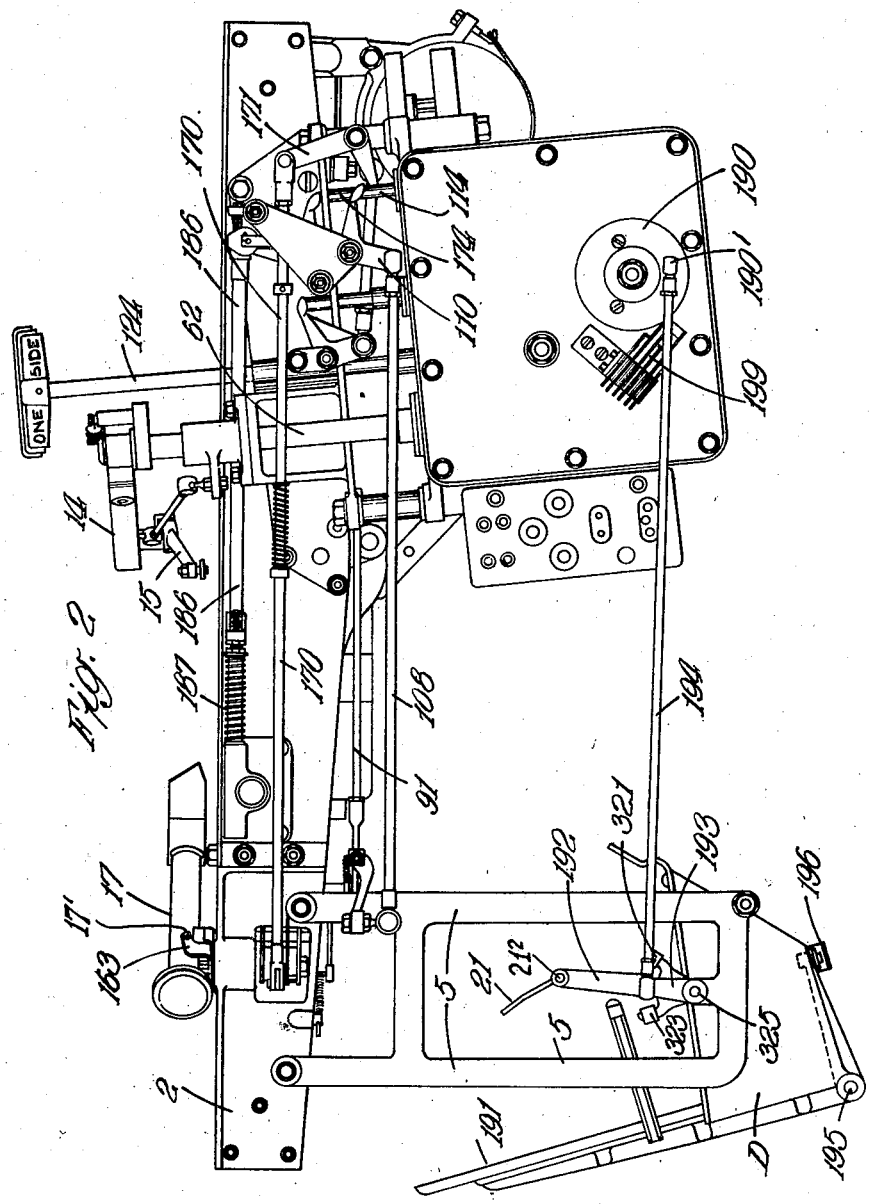

March 28, 1939. A. E. BOWYER-LOWE 2,151,891
AUTOMATIC GRAMOPHONE AND THE LIKE
Filed Sept. 14, 1937 11 Sheets-Sheet 4
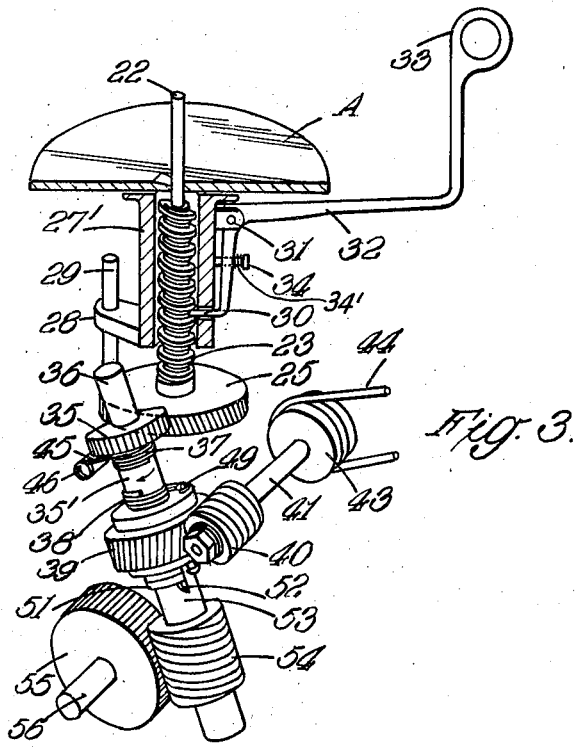
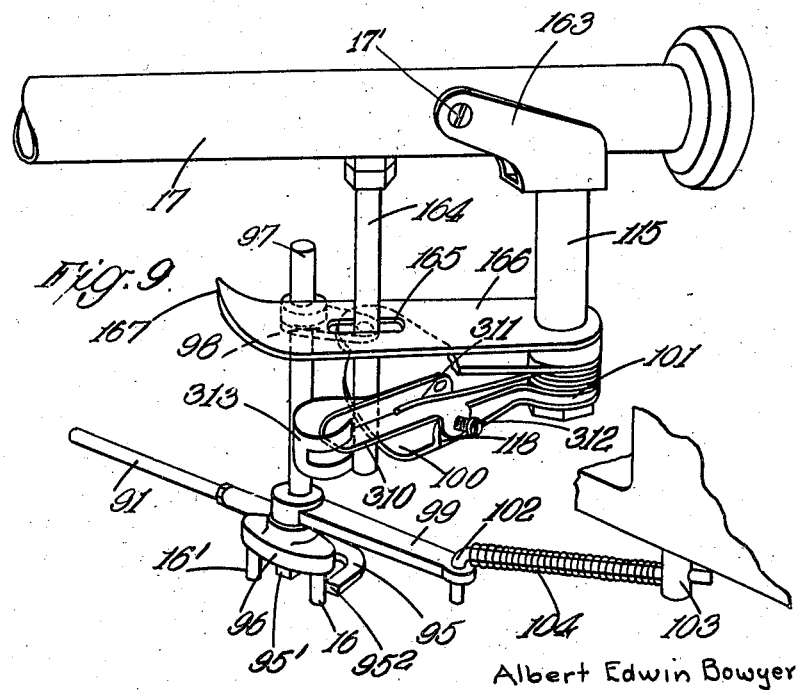
Albert Edwin Bowyer-Lowe
INVENTOR
his ATT'Y.

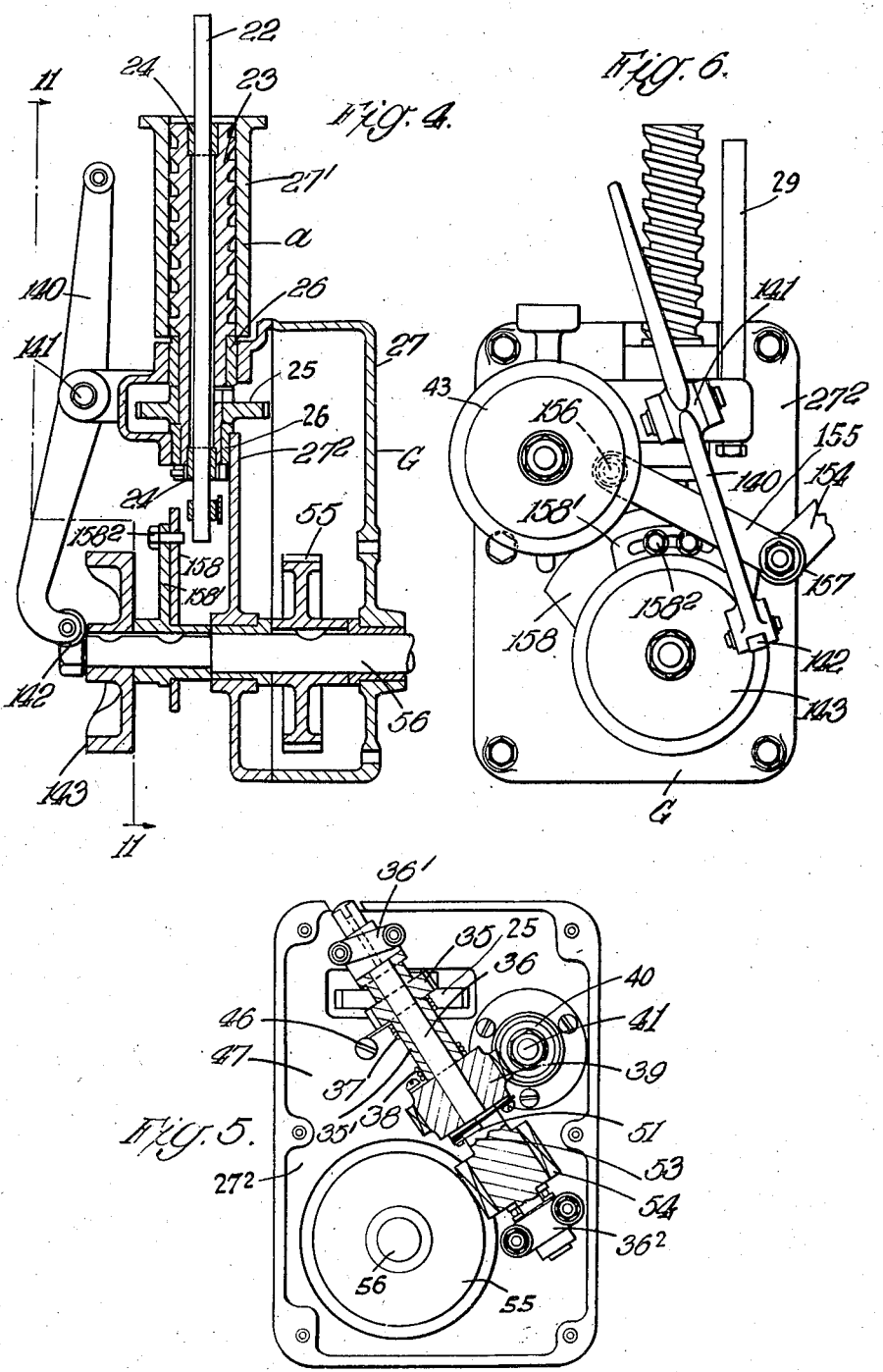

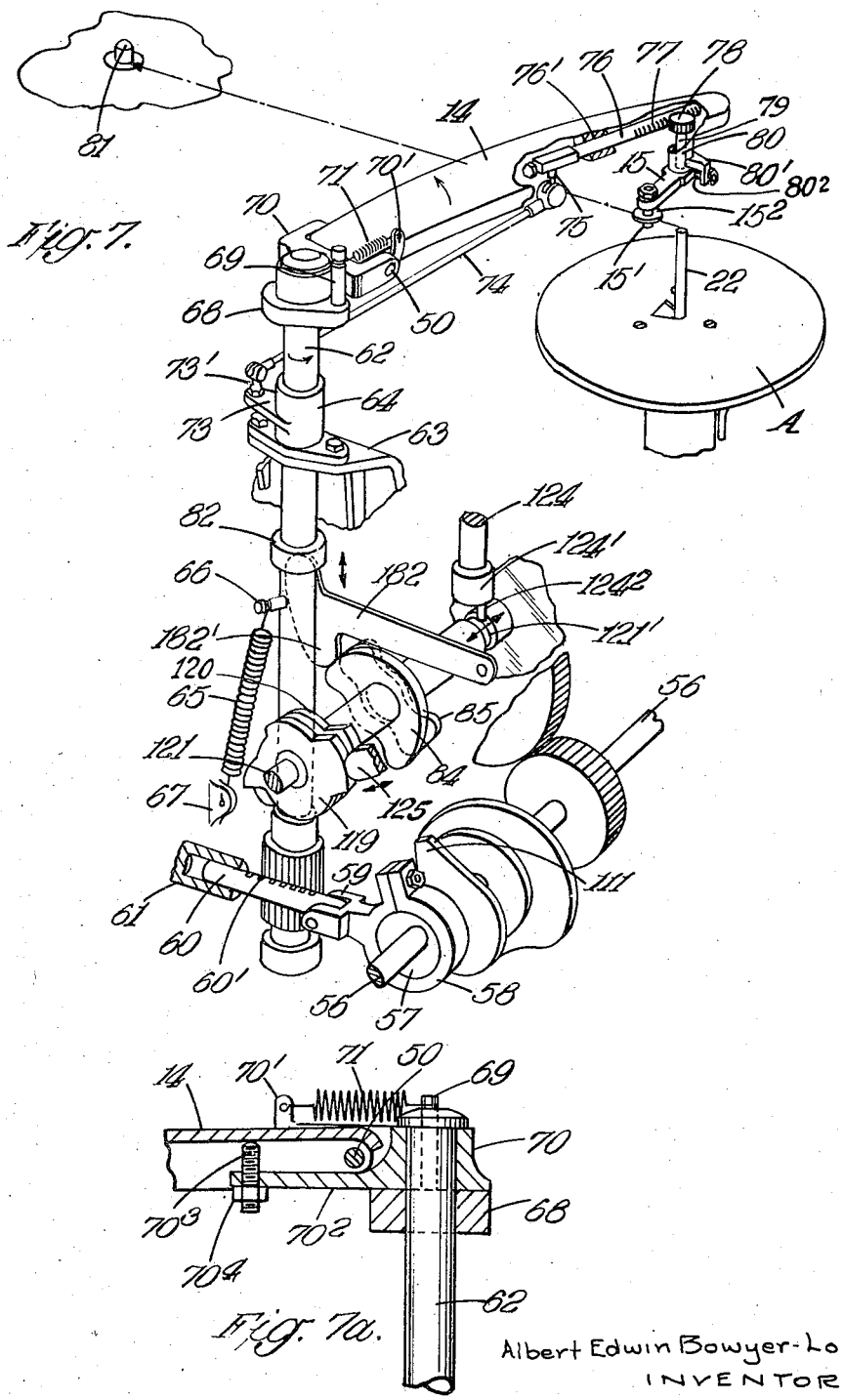

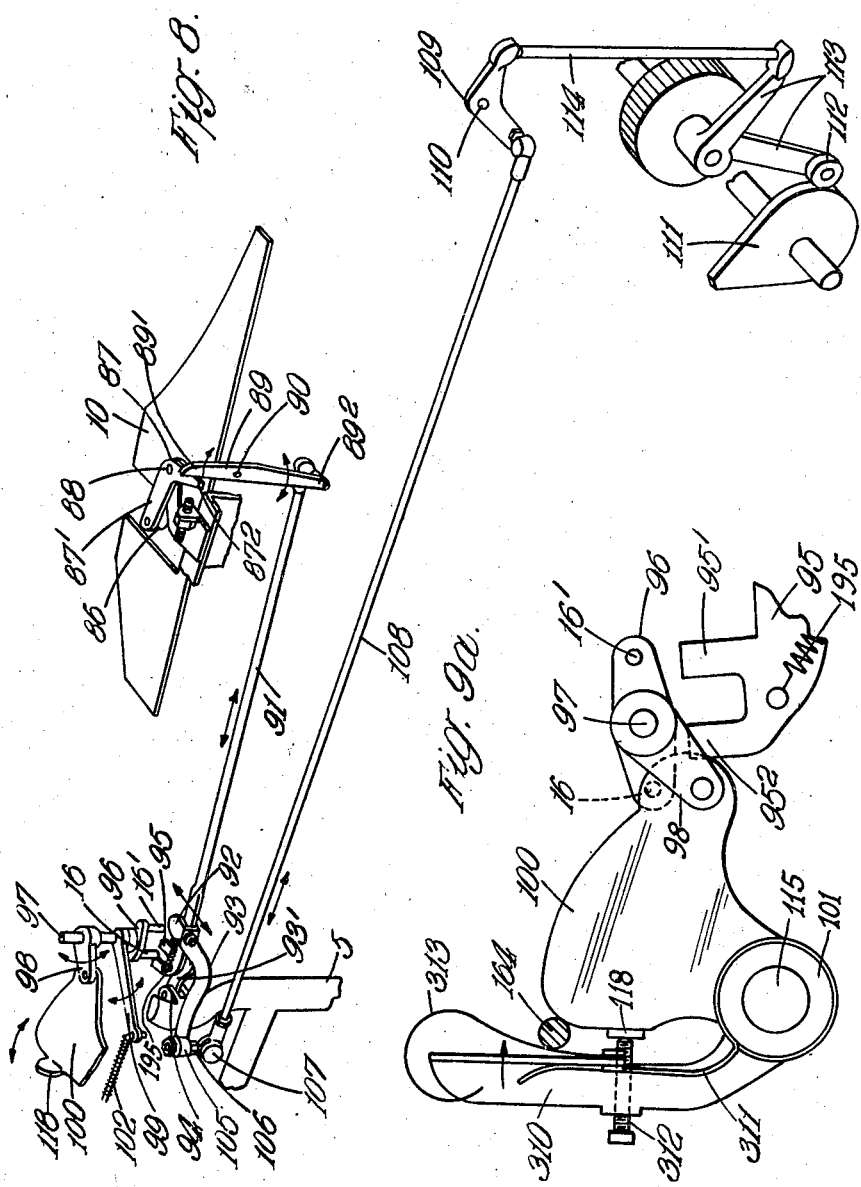

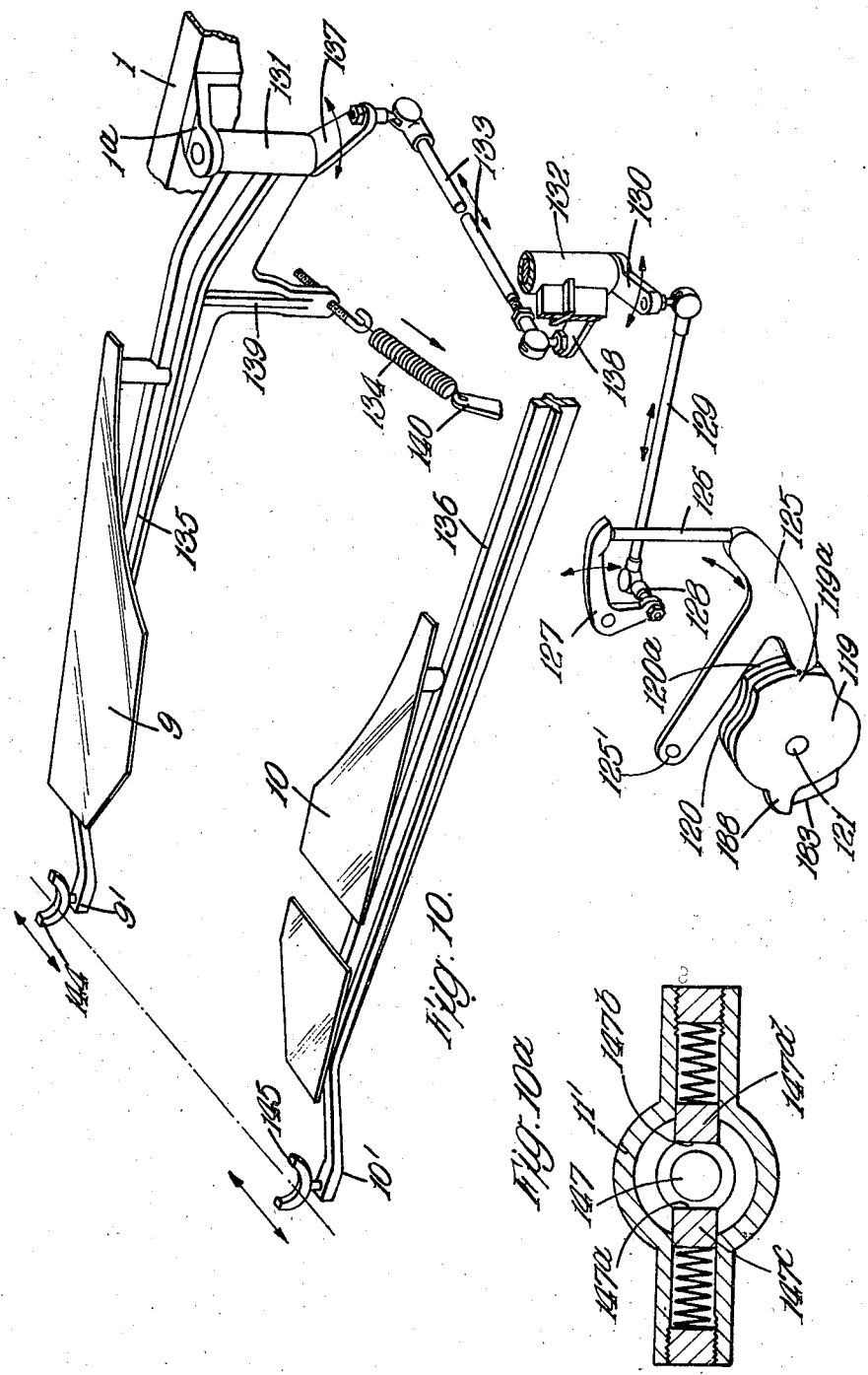

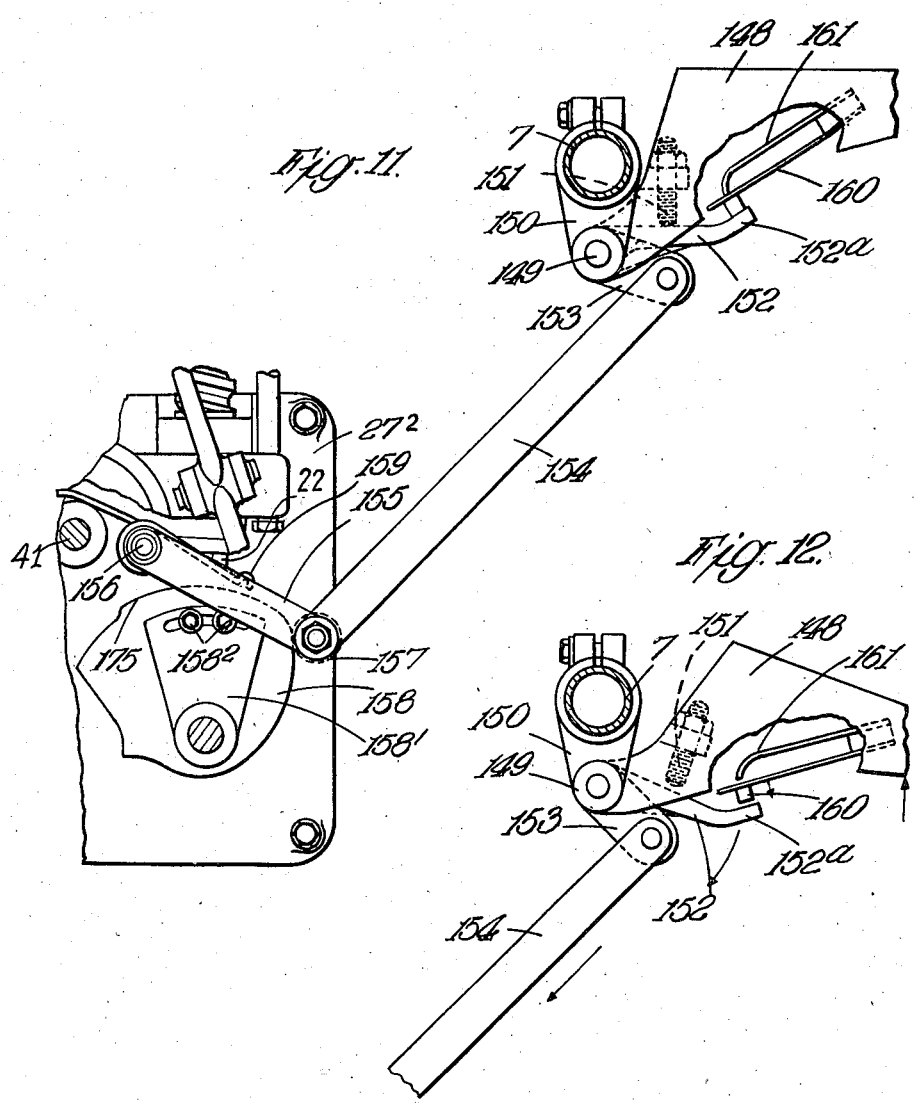

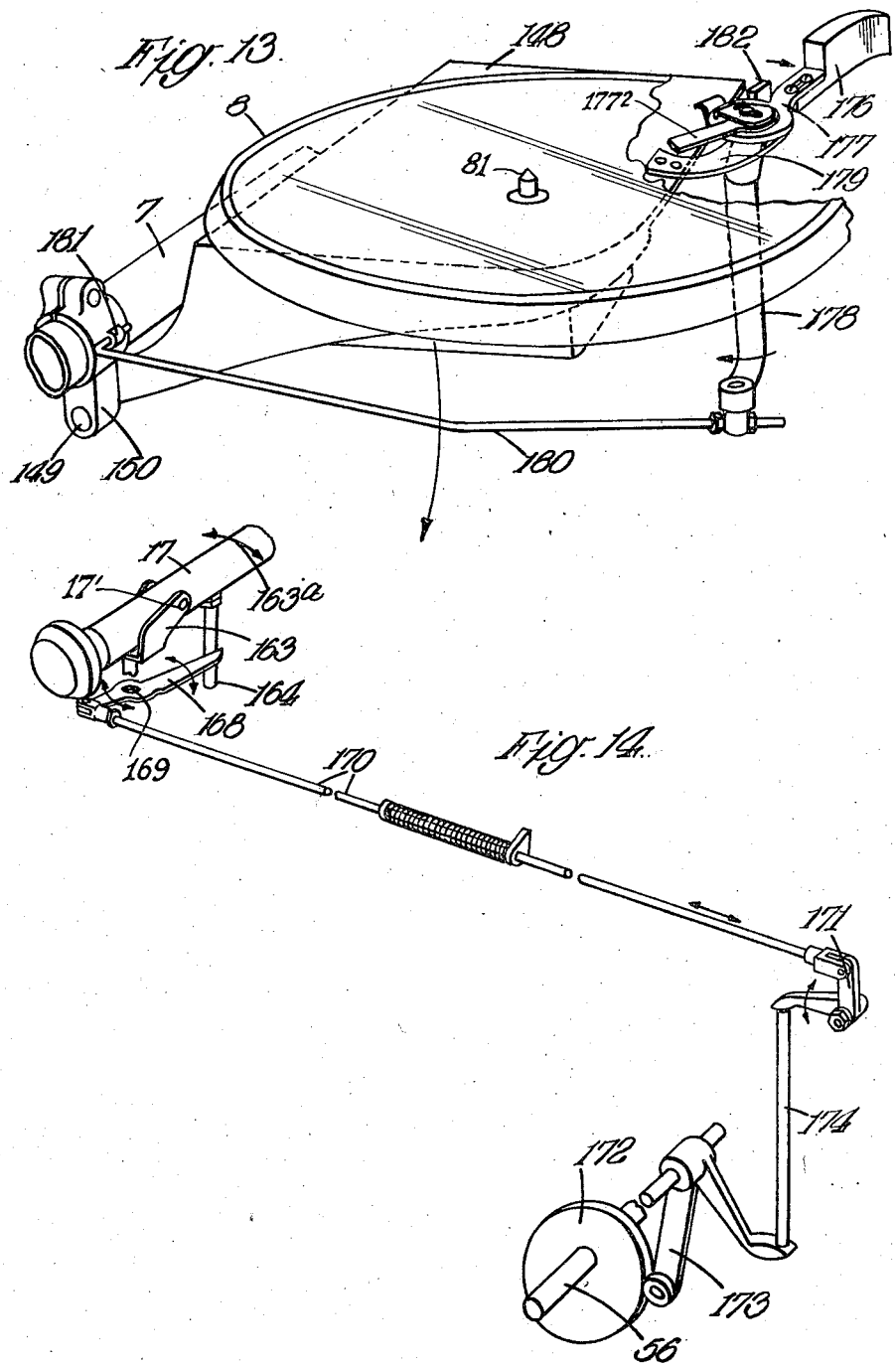

March 28, 1939.    A. E. BOWYER-LOWE    2,151,891
AUTOMATIC GRAMOPHONE AND THE LIKE
Filed Sept. 14, 1937    11 Sheets-Sheet 11
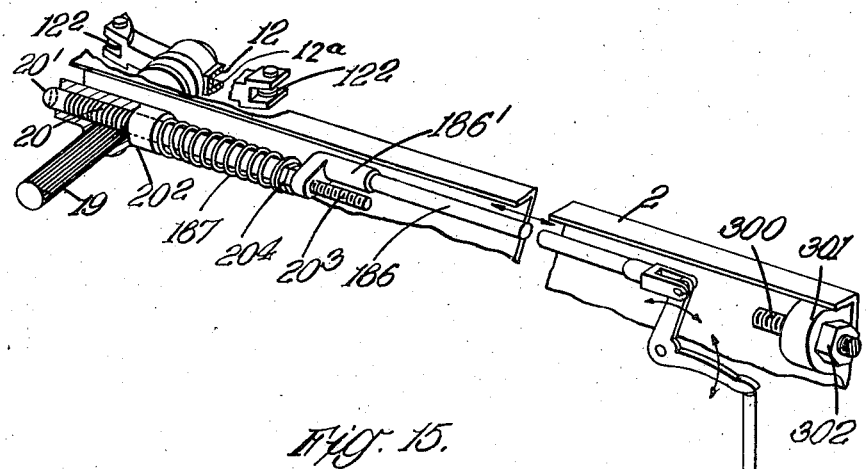
Fig. 15.
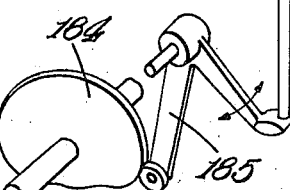
Fig. 16.
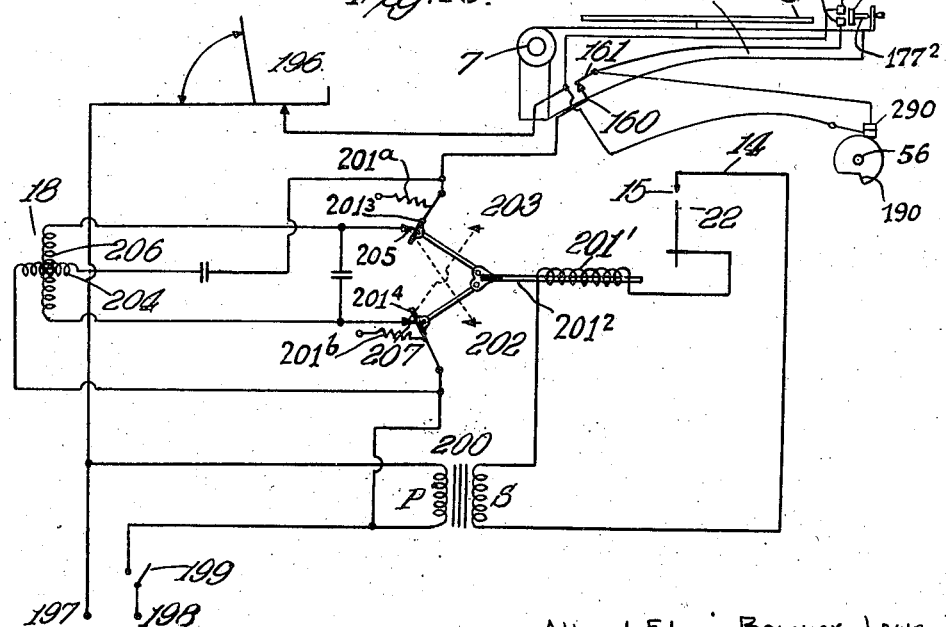
Albert Edwin Bowyer-Lowe
INVENTOR
By [signature]
his ATTY.

Patented Mar. 28, 1939

2,151,891

UNITED STATES PATENT OFFICE 2,151,891

AUTOMATIC GRAMOPHONE AND THE LIKE

Albert Edwin Bowyer-Lowe, Letchworth, England, assignor to Self Changing Gramophones Limited, London, England, a British company Application September 14, 1937, Serial No. 163,733
In Great Britain September 16, 1936

15 Claims. (Cl. 274—10)

This invention relates to gramophones wherein records are automatically fed one at a time from a stack onto a turntable where, after being played, on one side or on both sides they are automatically rejected into a discard magazine.

The various objects and novel features of the present invention will become evident from the following description of one embodiment of the invention given by way of example only, and from the appended claims.

The invention is illustratively exemplified in the accompanying drawings, in which Figure 1a shows in a perspective view one half and Figure 1b in a corresponding perspective view the other half of a gramophone apparatus according to the present invention with some of the parts broken away and covers removed for the purpose of clarity.

Figure 2 shows a side view of the apparatus.

Fig. 3 is a perspective view, partly in section of the stack table and driving mechanism.

Fig. 4 is a substantially vertical sectional view of the stack table mechanism, the housing therefor and end portion of the cam shaft.

Fig. 5 is an elevational view of the driving mechanism illustrated in Fig. 3.

Fig. 6 is an elevational view of the housing for the stack table mechanism and the end of the cam shaft, as it would appear if seen from the left in Fig. 4, showing a number of cams and transmission elements.

Fig. 7 is a perspective view of the record transfer arm and its driving mechanism; a sectional view of the transfer arm being illustrated in Fig. 7a.

Fig. 8 illustrates in a perspective view the elements which control the positioning of the tone arm.

Fig. 9 is a perspective view on a larger scale of the tone arm and associated control members; Fig. 9a is a plane view of the tone arm control elements illustrated in Fig. 9.

Fig. 10 is a perspective view of the guiding elements for the records and the actuating means for said guiding elements; Fig. 10a is a substantially longitudinal sectional view of a detail of one of the record gripping members.

Figs. 11 and 12 are elevational views of the mechanism for tilting the turn-table and its support, the elements being shown in different positions, in the two views.

Fig. 13 is a perspective view of the turn-table and its support and switching means.

Fig. 14 is a perspective view of the mechanism for resetting the tone arm.

Fig. 15 is a perspective view of the elements which drive the gripping members to reverse the records; and Fig. 16 is a diagrammatic view of the electric circuit of the device.

Figure 1A:
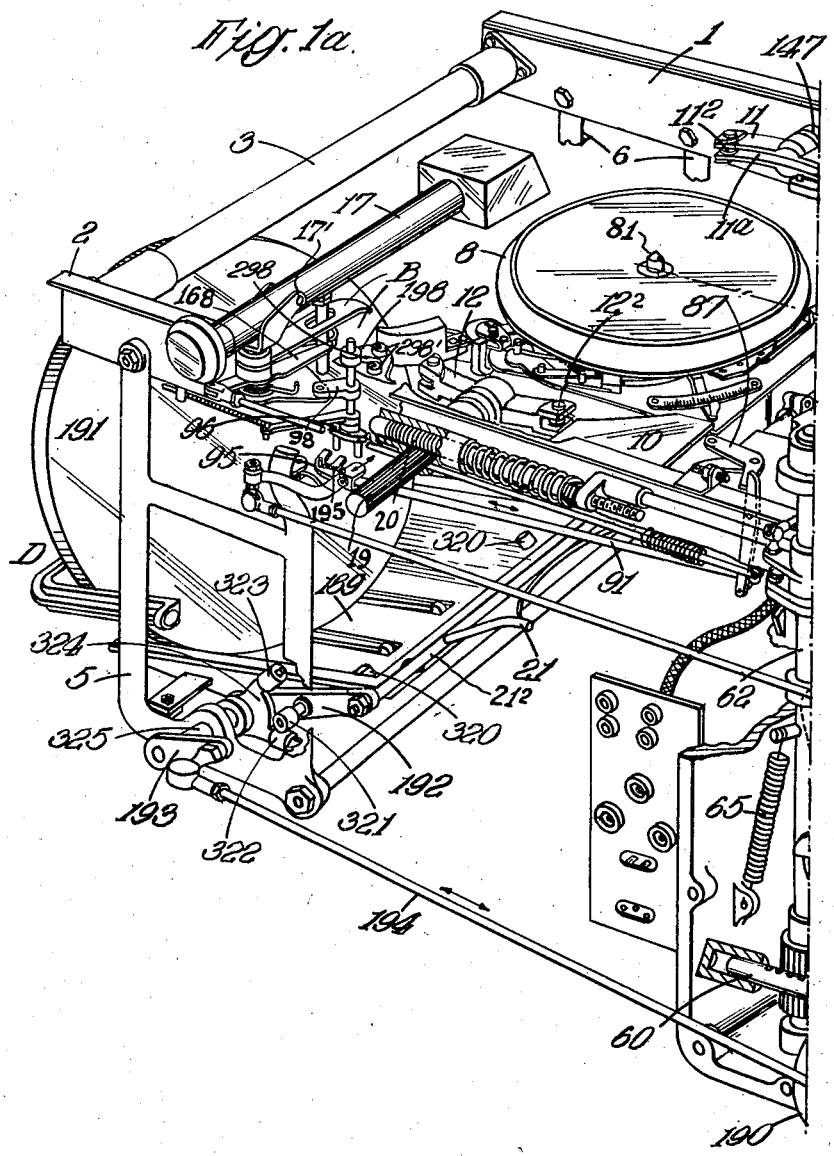

The apparatus shown by way of example in the drawings, includes a mechanism for transferring records, one at a time, from a stack to a turntable, a mechanism for feeding the records to the transfer mechanism, mechanism for determining the position of the playing arm according to the size of the record, means for stoppage of the playing at the end of the record, mechanism for turning over the record so that both sides may be played consecutively, and mechanism for discharging the record into a discard magazine after it has been played.

In order that the invention may be more clearly understood, the aforesaid mechanism will be first described generally before entering upon a detailed description.

Figure 1B:
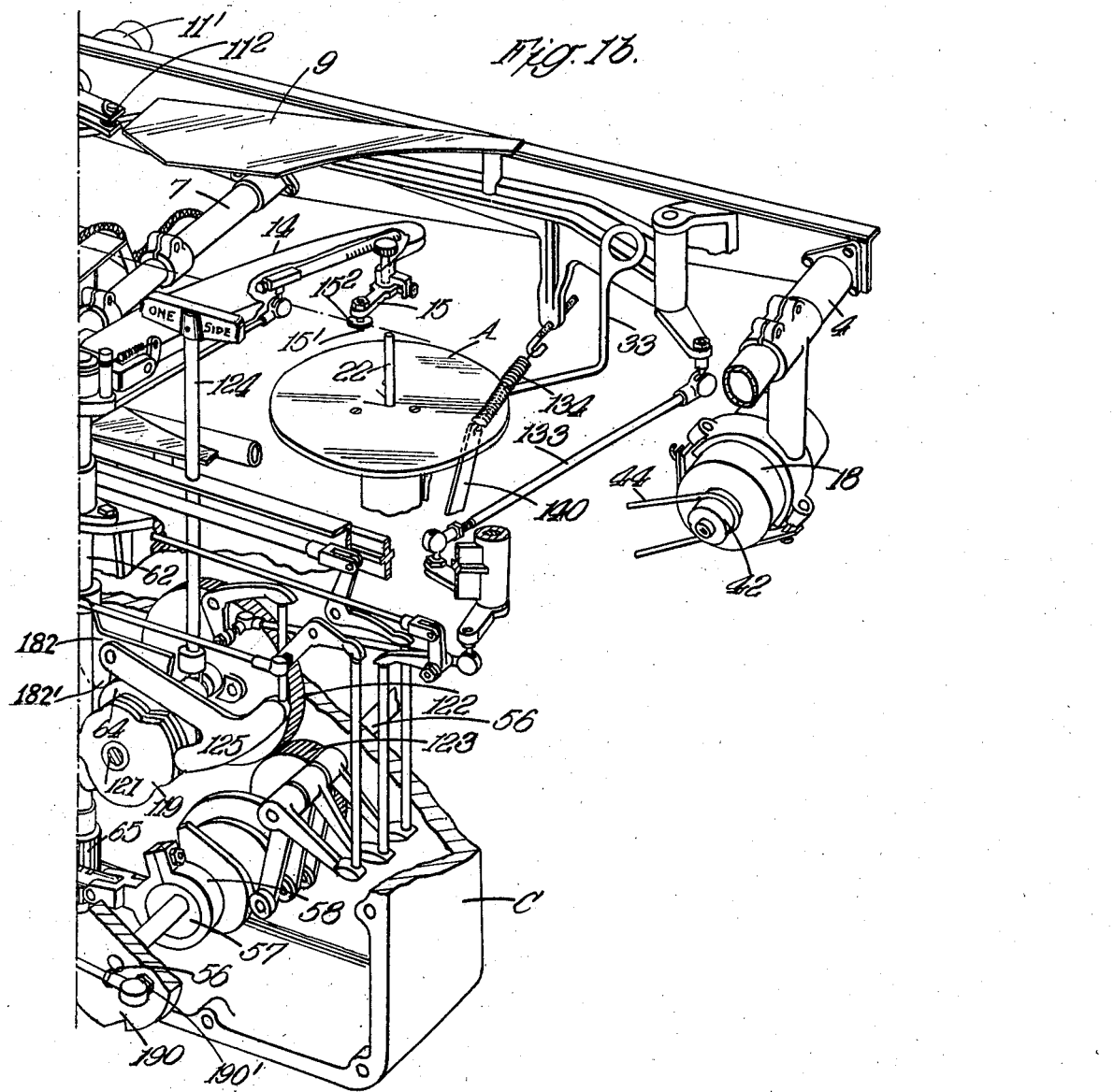

Referring to the drawings, and particularly to Figures 1a and 1b, the apparatus is supported by and within a frame-work formed of a pair of angle irons 1, 2, and cross rods 3, 4. At one end of irons 1, 2 are disposed a pair of substantially U shaped members 5 and 6, bolted by means of the free ends of their limbs to the angle irons and serving to support the discard magazine as hereinafter described. Disposed about midway between the two cross members 3 and 4, there is a third cross rod 7, to which a turntable 8 is hingedly connected in a manner such that it may be swung down to a generally vertical position and up to a generally horizontal position as seen in Figure 1.

To the right of the turntable 8 is the feed mechanism including a table A having a central spindle 22 extending upwardly therethrough, and up and down which the table A is adapted to slide.

Extending from adjacent the feed table A to a point short of the turntable 8, is a pair of guide members 9 and 10, inclined downwardly from the former to the latter of the two tables. The guides 9, 10 terminate at the lower end adjacent a pair of grooved record centering and record turning members 11 and 12.

In the front of the apparatus (as viewed in Figure 1) is a vertical shaft 62, secured to the angle member 2 and mounted for rotation about its axis. An arm 14, extending in a generally horizontal direction is mounted on the upper end of the rod and normally situated in its neutral position substantially mid-way between the feed table A and the turntable 8. A smaller arm 15 is mounted at the free end of the arm 14 and as hereinafter described in detail, this smaller arm 15 is rotatably mounted on the end of arm 14 in a manner such that when the arm 14 is swung from the one extreme limit of its travel to substantially its other limit position the free end of the smaller arm 15 travels along a substantially straight line, joining the centers of the two tables A and 8, as indicated by the chain and dotted line in Figure 1. In one extreme limit of its travel the end of the arm lies over the central spindle 22 of table A and is arranged to drop onto the top of it, whilst at the other limit of its travel it lies substantially above the central spindle 81 of the turntable 8.

Mounted on angle member 2, between the two tables is a record registering mechanism including a bell crank lever 96, connected by a system of levers to a mechanism for controlling the setting of a tone arm with the stylus on the smooth part of a record as determined by the registering device. The tone arm 17, which is pivotally supported on the angle member 2, is controlled by mechanism, generally designated by the letter B and arrow, for biasing the stylus inwards to engage the first groove of the record at commencement of playing and to swing back the tone arm beyond the initial position at the end of each record to clear the record whilst it is being turned. The turntable 8 is rotated by means of an individual electric motor (not shown), whilst the remainder of the operations are brought about by a separate reversible electric motor 18 through a gear box G (see Fig. 4) and series of cams, enclosed within a casing C, their followers and push rods as hereinafter described in detail. Before entering upon a detailed description of the various parts, the general sequence of operations will be described.

Assuming that feed table A is in its lowermost position and the arm 14 in its neutral position intermediate the feed and the turn-table, the spindle 22, is readily accessible, and the records it is desired to play are stacked upon the table A with the spindle 22 threaded through their central holes. They may be arranged in any desired order, irrespective of size, with the sides to be played first, uppermost. The initial movement causes the arm 14 to be swung back into the position in which pin 15¹ of a diameter substantially the same as that of the spindle 22, which extends downwardly from the end of arm 15 is situated above the spindle 22 whereupon the arm 14 is lowered until the pin 15¹ rests co-axially on the spindle 22.

The contact of the pin 15¹ with the spindle 22 closes a circuit through a relay for energising the motor 18 to rotate in one direction, and as this circuit includes the pin 15¹ and the spindle 22 it is closed so long as the pin rests on that spindle. The motor, in rotating, drives the feed table A upwards, raising the stack of records, with the pin 15¹ in the central hole of the topmost record, until the record engages a collar 15² on the pin 15¹ thereby causing the arm 14 to pivot upwardly about its hinge, and to break the circuit of the relay, whilst the next record is still engaged by the spindle 22. The arrangement is such that the upward travel does not stop immediately, but continues so that there is a slight over-run for the purpose of ensuring that the top-most record is completely clear of the spindle top, whilst the next record is only partly threaded onto the spindle 22. The distance between the collar 15² and the free or lowermost end of pin 15¹ is equal to less than the thickness of the thinnest record likely to be played.

When the circuit is broken and the relay de-energised, a circuit is closed for driving the motor in the reverse direction; this motor being of a type which will reverse its direction within a fraction of a second is known of itself and as it forms no part of the present invention, no description thereof is given.

The motor, now running in the reverse direction, rotates the vertically extending shaft 62 about its vertical axis through a gearing illustrated diagrammatically in Figures 3 and 7, a clutch mechanism of special construction being provided to enable the feed table A to be upwardly driven when the motor is rotating in one direction and to drive the shaft 62 when rotating in the reverse direction.

The shaft 62 in rotating, causes the arms 14 and 15 to swing towards the left (as viewed in Figure 1) and carrying with them the topmost record which, in being moved, slides onto the guides 9 and 10 towards the turntable 8. In its passage along the guideway, the record brushes against a roller 86 on bell crank 87, thereby causing a U-shaped member 95 to take up a position opposite one or other of two pins 16, 16' controlling the position to which the tone arm is to be moved to set the stylus into initial playing position. This mechanism thus registers the size of the record and sets the position of the stylus accordingly.

As the record, moving down the guide way 9 and 10 approaches the centering and record turning members 11 and 12, a cam functions to relieve the pressure of a spring urging the members towards each other so that the record may slide readily into the grooves of these members. A cam in the casing C through suitable push rods release the record as soon as it is centrally disposed above the central spindle 81 of the turntable.

As soon as the record is gripped by the centering members, the arm 15 is raised out of contact with the record and the transfer arm 14 may thereafter be returned to its neutral position whilst still raised to prevent damaging the record. At the beginning of the operations hereinbefore described, the turntable was hanging down on its hinges, but during the operations was slowly raised to a substantially horizontal position which it reaches before the record is released by the two centering members 11, 12 moving away from one another. Consequently, the spindle of the turntable is immediately below the central hole of the record, and when the latter is released, it is dropped onto the turntable which, in the meantime, has already been set in rotation by closure of a circuit for its driving motor. The tone arm 17 is so positioned that at this time the stylus engages the smooth edge of the record, as determined by the registering mechanism, whilst a moment later the pick-up in which the stylus is held is biased inwards a small amount about its pivotal axis so causing the stylus to engage the initial groove of the record. The main driving motor 18 together with the remainder of the mechanism is now stopped and is ready for the next sequence of record changing operations. The record is played in the usual manner until at the end, when an auto-stop device of known construction is actuated by the tone arm to switch off the turntable motor. The auto-stop device also causes the circuit of motor 18 to be closed to drive it in the aforesaid reverse direction.

Turntable 8 drops slightly until the record is once more opposite the grooves in the centering members 11, 12 whereupon the latter are moved inwardly towards each other to grip the record.

Continued rotation of the driving motor 18 causes the turntable to swing downwardly to its substantially vertical position whereupon rack 20, engaging a longitudinally toothed shaft 19, is operated by cams in casing C to rotate the said shaft. The gripping member 12, being mounted on the shaft 19, is rotated with the latter and, since the member 11 is rotatably mounted and connected to member 12 by means of the record, the record is turned over onto its other side, this rotating movement being stopped as soon as the record has been rotated through 180°.

Upon completion of the rotary movement of the record, the turntable is once more raised to its initial substantially horizontal position, the record is deposited thereon, the turntable is raised further to its final horizontal position and the record thereon is played as before. At the end of the record, the auto-stop works once more and the turntable is lowered. But this time, the closing operation of the gripping members is delayed and, therefore, instead of the record being taken off the turntable by the gripping members, it remains on the turntable until the same has traversed a distance equal to about two thirds of its complete travel from the horizontal to the vertical position. Then the record strikes two arms 21, 21', extending from the discard magazine, and is removed clear of the turntable. The two arms 21, 21' are actuated by a mechanism, connected with an eccentric 190 on the cam shaft 56, to rock the record from its dropped position and stack it in the discard magazine indicated by the general reference letter D. The sequence of operations resulting in a fresh record being fed from the feed table A to the turntable 8, is now repeated.

Means are provided for at will rendering ineffective the record turning mechanism, whereby only one side of each record of a stack are played.

Having now described the general sequence of operations, the various means whereby these may be effected will be described in detail.

*Record feed mechanism*

The mechanism for feeding the records to the transfer mechanism is illustrated diagrammatically in Figures 1 to 4. As there shown, the mechanism comprises a vertical spindle 22 passing coaxially through a hollow cylindrical helical screw 23. Both spindle and screw of metal, but are electrically insulated from one another by means of bushes 24 of insulating material fitting tightly within the screw 23 to hold the spindle 22 rigidly in position for rotation with the screw. The spindle is substantially longer than the screw so that at both ends it protrudes beyond the ends thereof.

A gear wheel 25 is connected to the lower end of the screw 23 which is rotatably supported in bearings 26 carried by the cover plate 27² of a housing 27. This housing is supported by brackets extending from cross member 4, but which have been omitted from the drawings for the sake of clarity. Surrounding the screw 23 is a cylinder 27' having a lug 28 formed integral therewith. This lug is provided with an aperture through which passes a rod 29 secured to some stationary part of the framework, for example, to the cover plate 27² of casing 27.

A detent 30 pivoted at 31 on the cylindrical member 27' has an arm 32 terminating in a finger hole 33.

The detent 30 passes through an aperture in the cylinder 27' and is urged into engagement with the thread of the worm 23 by a spring 34' on a pin 34. Consequently, if the screw 23 is rotated in one direction, the cylinder 27' will be caused to rise, the lug 28 being a sliding fit on rod 29. If the detent 30 is withdrawn from the worm 23 by raising the arm 32, the cylinder 27' may be raised or lowered as desired. It will be evident that the cylinder 27' is prevented from being rotated by means of rod 29.

Mounted on the top of the cylindrical member 27' is a circular disc constituting the feed table A.

The diameter of the spindle 22 being just smaller than the diameter of the centre hole of a record, the records to be played may be threaded on to the spindle and stacked upon the table A. When the spindle 22 and screw 23 are rotated in one direction, the table A will be caused to rise and carry upwardly with it the stack of records disposed thereon. The spindle 22, however, will not rise and consequently, as the stack of records is lifted, the topmost record will eventually be raised to the level of the spindle top.

The means for rotatably driving the spindle 22 and screw 23 comprises a spindle 36 journalled in bearings 36', 36², which are secured to the inside of the cover plate 27² mounted on the casing 27. The spindle 36 is mounted for convenience diagonally across the plate, as shown in Figure 5. Rotatably mounted on the spindle 36 and engaging gear wheel 25 is a pinion 35 having a sleeve-like boss 35' formed integral therewith. A helical spring 37 surrounds the sleeve 35' and has one end free, whilst the other end 45 is anchored to a pin 46 (Figures 3 and 5) rigidly mounted on cover plate 27². The arrangement of the spring 37 and sleeve 35' is such that when the sleeve is rotated in the direction indicated by the arrow in Figure 3, the spring 37 tends to unwind and consequently the sleeve is permitted to rotate.

On the other hand, if it is attempted to rotate sleeve 35' in the opposite direction, the spring 37 will tighten there around and prevent rotation in the direction opposite to that indicated by the arrow.

Hence, rotation of the sleeve in one direction only will cause gear wheel 25 to be driven by pinion 35. Abutting the free end of sleeve 35' and co-axial therewith is a second pinion 39 rotatably mounted on the spindle 36. This pinion 39 rests upon an enlarged portion or collar 53 of the spindle which terminates in a worm wheel 54. The pinion 39 has a screw 49 in its upper face which forms an anchor for one end of a coil spring 38 wound about the sleeve 35'. Pinion 39 is in engagement with a worm wheel 40 on the spindle 41 so as to be driven by the main motor 18 in either direction through pulley 42 (Figure 1), belt 44, pulley 43 (Figure 3) and driving spindle 41. A pawl 51 on the lower face of pinion 39 is adapted to engage a groove 52 in boss 53 when the pinion 39 is driven in a direction opposite to that shown by the arrow in Figure 3 and thereby to cause rotation of the boss 53 and worm 54 in that direction. During the time the pinion 39 is being driven in the direction indicated by the arrow, the pawl 51 slips round boss 52 without driving it.

The arrangement of the elements just described is such that when the pinion 39 is driven in the direction indicated by the arrow, spring 38 is tightened whilst spring 37 is loosened resulting in the rotation of the pinion 35 to drive gear 25. Meanwhile, the worm 54 remains stationary. When pinion 39 is rotated in the opposite direction, the spring 38 slackens to release sleeve 35', whilst any tendency for that sleeve to rotate is prevented by the tightening of spring 37. Consequently, no driving power is transmitted to the gear 25. On the other hand, the pawl 51 engages slot 52 thereby causing rotation of boss 53 and worm 54. The latter worm is in driving engagement with a pinion 55 rigidly mounted on a cam shaft 56 passing through casing C housing a number of cam mechanisms for controlling various operations of the gramophone.

At this time it will be remembered that the pin 15' on the small arm 15 is resting on top of the spindle 22, and it will also be remembered that the driving circuit for the main motor 18 includes the spindle 22 and the pin 15'. When the stack of records rises sufficiently, the pin 15' engages the hole of the topmost record and shortly thereafter, the upper surface of this record engages collar 15$^2$ thereby pivoting the arm 14 about its hinge 50 in a manner to be described later, it being sufficient at present to state that the driving circuit is thereupon broken, the relay de-energised and the motor 18 reversed. It should be noted, however, that the rise of the feed table A does not stop immediately the pin 15' is raised and the circuit broken, as the momentum of the moving parts is such that a slight over-run results, which raises the upper edge of the record next to the topmost slightly above the top of the spindle before the rising movement of the table A is terminated. The speed at which the table A is raised may be selected so that the required momentum can be attained for the required degree of over-run. This speed can be obtained by selecting suitable sizes of pulleys 42, 43 or gears for drivably connecting the motor 18 to the table and/or suitable adjustment in the weight of parts. The purpose of this over-run will be evident later.

*Transfer mechanism*

Having now explained the feed mechanism, the mechanism for transferring the top-most record from the feed table to the turntable will be described next, with reference to Figures 1 and 7. Referring first to Figure 3, upon the current being interrupted as previously described, the motor stops and is caused to rotate in the opposite direction, thereby rotating spindle 41, worm 40 and pinion 39 in the opposite direction. In this direction of rotation the pinion 39 as previously explained drivably engages worm 54 meshing with pinion 55. The shaft 56 is consequently now driven by the main motor 18. The spindle 56 carries an eccentric 57 rigidly mounted thereon and within a co-operating annular member 58. The annular member 58 is provided with a knuckle joint 59 associated with a rod 60 having a toothed portion 60$^1$. The free end of rod 60 is slidably mounted within a hollow cylindrical bearing 61 in a manner such that as the spindle 56 is rotated the eccentric 57, 58 causes the rod 60 to move first in one direction and then in the opposite direction along its longitudinal axis.

The toothed part 60$^1$ of rod 60 engages vertical teeth in an elongated toothed wheel 65 rigid on a vertical shaft 62. This vertical shaft is mounted for rotation in a collar 64 rigidly mounted on a bracket 63 connected to the angle member 2, the arrangement of the rod 60 and vertical shaft 62 being such that as the rod moves along its longitudinal axis the vertical shaft is rotated to-and-fro about its longitudinal axis.

A collar 68 having an upstanding pin 69 is rigidly mounted immediately below the upper end of the vertical shaft 62. An arm 14 is pivoted by means of a pin 50 to a bifurcated member 70 mounted free for rotation on the top portion of shaft 62 and adapted to abut against pin 69. The arrangement of parts 68, 69 and 70 is such that when the vertical shaft is rotated, the arm is positively rotated in the direction shown by the arrows due to the pin 69 bearing on the member 70, so that the free end of the arm 14 is swung to the left, as viewed in Figure 7. When the vertical shaft 62 is rotated in the direction opposite to that shown by the arrow, the arm 14 tends to leave the pin 69 but is prevented from so doing by a tension spring 71 extending between the pin 69 and an extension 70' of the member 70. Consequently, in the latter direction, there is a resilient coupling between the vertical shaft 62 and the arm 14. The purpose of this resilient coupling will become evident later.

The arm 14 on its pivot 50 would tend to hang downwardly, but this is prevented by an adjusting screw 70$^3$ threadedly engaging an extension 70$^2$ of the member 70 carrying pin 50 and resting on collar 68 (Figure 7a). The screw 70$^3$ adjusts the horizontal position of the arm 14 and is locked in its adjusted position by nut 70$^4$.

At the other end of arm 14 and parallel thereto, a rod 76 having a rack portion 77 is mounted within a bracket 76' on the arm 14 so as to slide along its longitudinal axis. At the end of the rod 76 nearest the collar 68 is a downwardly projecting pin 75 hingedly mounted in the free end of the rod 74, the other end of which is hingedly connected to a pin 73' mounted on a fixed bracket 73 projecting laterally from collar 64. The arrangement of the two rods is such that as the shaft 62 is rotated to swing the arm 14 in the direction shown by the arrows, the rod 76 is caused to move outwardly along its longitudinal axis, whilst when the arm is swung in the opposite direction the rod 76 is moved inwardly.

The rack part 77 of rod 76 engages a pinion 78 mounted on the end of a downwardly extending spindle 79, journalled in a bearing 80 depending from the free end of arm 14, and carrying the arm 15. A bracket 80' is rigidly mounted on the bearing 80 and through this bracket 80' extends a set screw 80$^2$ forming a stop for the small arm 15. When the short arm 15 engages the stop 80$^2$, further rotation of the pinion 78 is prevented. The rack 77 cannot slide further and the rod 76 is locked whereby further lateral movement of the arms 14 and 15 is prevented, at which time the pin 15' is immediately above the spindle 22. The spring 71, already described, in providing a resilient connection between the shaft 62 and arm 14, permits this checking of the movement of the arm 15 for the correct positioning of the pin 15' above the spindle 22, the arm 14 and member 70, if necessary, separating somewhat from pin 69.

The arm 15 projects in a direction generally towards the shaft 62 and terminates in the downwardly extending pin 15' having a collar 15$^2$ mounted thereon and spaced from the free end of pin 15' a distance equal to slightly less than the thickness of the thinnest record to be used. It will be evident that when arm 14 swings, the small arm 15 will also be rotated with respect to arm 14 due to the movement of the rack 77 relative to the pinion 78. The arrangement of the arms and rack is such that the end of the pin 15' will travel along a substantially straight line joining spindle 22 of the feed table A and the spindle 81 of the turntable. The path of the end of pin 15' is indicated by chain and dot line in Figure 17.

The pin 73' lies eccentrically with respect to the axis of the vertical shaft 62 and the arrangement is such that when the movement of the rod 76 in the outward direction is stopped by its end abutting the closed free end of the arm 14, the latter is rocked about its pivot 50 to raise its free end and with it the arm 15. This lifting of the arms 14 and 15 is designed to take place immediately upon a record being gripped by the members 11 and 12.

The vertical shaft 62, together with the arms 14 and 15 supported thereon, is also adapted to have vertical movement. This vertical movement is effected by the engagement of a cam follower 182 engaging a collar 82 fast on the shaft 62. The lower lobe 182' rides on either one of the cam members 84 and 85 mounted fast on the shaft 121 adapted for axial movement under control of the vertical spindle 124. This axial movement of the shaft 121 is brought about by an eccentric pin 124²—mounted on a collar 124' carried at the end of the vertical spindle 124—engaging an annular groove 121'.

When the spindle 124 is rotated into the one position in which the mechanism is set to play both sides of a record, as illustrated in the drawings, the lower lobe 182' rides on the cam 84, which is so shaped that the vertical shaft 62 and the arm 14 are maintained in the raised position after completing the feeding of the record until the feeding of the next record is to commence. When, however, the vertical spindle 124 is set so that the mechanism will play one side only of the record, the lower lobe 182' rides on the cam 85, which is so shaped that after feeding the one record the shaft 62 is raised until the record has been played and the feeding of the next record is to commence. The cam 85 is, therefore, symmetrical, the one half corresponding to one cycle of operations being identical with the opposite side corresponding to the next cycle. It should here be noted that the movement of the shaft 121 should only take place when like parts of the cams 84 and 85 are adjacent the lower lobe 182' of the follower 182 and like parts of the cams 119 and 120 are similarly adjacent their follower 125, that is to say, when the arm 14 is in its neutral raised position. The operation of the cams 84 or 85 is such that the shaft 62 is raised soon after the arm 15 has positioned a record in the centering devices 11 and 12, maintained raised during the time the arm 14 is in its neutral position, and lowered only when moving from its neutral position in the direction opposite to that shown by the arrows for positioning the pin 15' above the spindle 22 as already described. The shaft 62 is allowed to remain in its lowered position until the record is gripped by the centering devices 11 and 12. The return axial movement of the shaft 62 is aided by the spring 65, which is tensioned when the shaft 62 is raised in axial direction by the cam follower 182. The rotation of the shaft 62 is brought about by the parts 57, 58, 59, 60 and 65 previously described.

The record feed mechanism already described has, due to the over-run, raised the topmost record on the stack slightly above the level of the spindle 22 and reversed the circuit of the driving motor 18 to begin the operation of the transfer mechanism by rotating the shaft 62 in the direction of the arrows. The shaft 62 in rotating the arm 14 causes movement of the small arm 15 in a horizontal plane as last described, and this movement of arm 15 causes the topmost record to be slid from the stack and moved towards the turntable 8. It should be noted that the top of spindle 22 is domed to a height equal to about the difference between the thickest and the thinnest records to be used. This variation thickness, on taking the average of several thousand records, has been found to be about one thirty-second of an inch.

This doming is an extra precaution and ensures that the records are slid off one at a time independently of variation in thickness of successive records and acts additionally to the over-run previously mentioned. The record as it is slid off the top of the stack by the motion of arms 14, 15 is slid onto the guides 9 and 10 which comprise flat metal members arranged to slope downwardly in a direction from the feed table A towards the turntable 8 and also to slope downwardly towards each other so that as the record is slid along the runway thus formed, only the edge of the record is in contact therewith.

*Size registering mechanism*

As it is slid along the runway, the record encounters registering mechanism for determining its size and accordingly adjusting the position to which the tone arm and pick-up is subsequently to be moved to commence playing the record.

The registering mechanism is illustrated generally in Figure 8 and comprises a bell crank lever 87 pivoted at 88 on the side member 2 to be capable of rocking in a generally horizontal plane. At the end of one arm 87' of the bell-crank lever 87 a roller 86 is provided, positioned in the path traversed by the record as it passes along from the feed table A to the turntable, and consequently on a record encountering the roller 86 the crank 87 is caused to be rocked about its pivot 88. The movement of the crank is imparted through its other arm 87² to the arm 89' of the lever 89 pivoted at 90 to the side member 2 in a vertical plane at right angles to the general plane and direction of the runway formed by the guides 9, 10. The end 89² of the lever 89 is connected through a universal joint with one end of a rod 91. The other end of the rod 91 terminates in a bifurcated member 95, and this end of the rod is slidably carried within the forked end of a lever 93 pivoted by means of an extension 93' between lugs 94 on the part 5. When the bell crank 87 is rocked, the lever 89 is similarly rocked and the rod 91 is moved along its longitudinal axis proportionate to the displacement of the crank 87 to assume one of its three possible positions. Opposite each of the two adjusted positions which the fork 95 is adapted to take up lies one of two downwardly extending pins 16 and 16' each mounted at the extremities of a lozenge-shaped plate 96 centrally pivoted to rotate in a horizontal plane. Plate 96 is mounted on the lower end of a vertically extending rod 97 journalled in a lug 198 (Figure 1) integral with angle member 2. Rigidly mounted on the rod 97 are three arms extending laterally therefrom of which the intermediate arm 98 is pivotally connected to one corner of a triangular plate 100, itself pivoted at 101 as described later, whilst the upper arm 298 limits the rotation of the rod 97 by engaging one or the other of two stops 298¹ provided on lug 198. The stops are formed as eccentrics so that the distance between their adjacent surfaces may be altered, thereby adjusting the setting of the plate 100. The lower arm 99 has a rod 102 connected to the free end thereof to pivot in a horizontal plane. The other end of rod 102 is mounted to slide in a hole in a pin 103 (Figure 9) mounted to swivel on part of angle member 2.

The rod 102 passes through the centre of a coil spring 104 bearing with one end against a turned down portion of the rod 102 and with the other end against pin 103. The arrangement of the lower arm 99 is such that when the rod 97 is rotated from one extreme limit of its travel to the other in a manner to be described hereafter, the spring 104 maintains the rod 97 in that extreme position. The intermediate arm 98 upon rotation of the rod 97 causes the triangular plate 100 to move from one to the other of its extreme positions of travel.

Reverting now to the control of the rod 91, it has already been stated that the forked member 95 thereof may be positioned in one of three alternative positions, i. e. its normal position, its first adjusted position for one size of record, and its second adjusted position for a larger size of record. The forked end 95 in sliding between the limbs 92 of the cranked fork member 93 may be displaced either to a position in which the limb 95' is opposite the pin 16', or to a second position, in which the limb 95² engages the pin 16. When, however, the parts are in their neutral position, the pin 16' lies between the limbs 95' and 95² so that during the functioning of that part of the mechanism about to be described, it does not cause the operation which would otherwise take place if either limb engaged its respective pin.

The outer end 105 of crank 93 forms a support for a downwardly extending pin 106 which is adapted to have slight rotation in its support. Pin 106 forms one part of a hinge member 107, provided at one end of a rod 108 having its other end swivelled at one arm of a bell crank 109. The crank 109 is adapted to be rocked about a pivot 110 by means of cam 111 (rigidly mounted on shaft 56) through roller 112, rocker 113 and push rod 114.

As shaft 56 is driven by motor 18, the cam 111 is rotated until it causes rocker 113 to rock and thereby pull rod 108 along its longitudinal axis towards the right as viewed in Figure 8. This causes crank 93 to pivot about its support 94 with the result that the forked end 92 is pushed inwardly, carrying with it the left hand (Figure 8) end of rod 91. In moving forward the bifurcated part 95 engages one or the other of pins 16, 16' according to the position to which it has been moved by bell crank 87 and pushes that pin forward thereby causing the rod 97 to be rotated together with the triangular plate 100 as previously explained. The rod 102 with its spring 104 locks the members in the position reached. It will be appreciated from a study of Figure 8 that the forward movement of one pin 16 will cause the plate 100 to rotate in one direction while the forward movement of the other pin 16' will cause the plate to be rotated in the other direction.

The triangular plate 100 is pivoted at 101 on the same vertically extending member 115 which supports the tone arm 116, but is so arranged that movement of the plate does not cause movement of the tone arm 116.

The plate 100 is provided on one side thereof with an upstanding stop member 118, the purpose of which will hereinafter be made apparent.

The plate 100 in either one of its two positions, as determined by the size of the record, sets the position of the tone arm. The sequence of operations controlled by cam 111 is timed to occur while the record is being carried past and still in contact with the roller 86 on crank 87. A spring 195 fixed to the bifurcated part 95 on the one hand and to the fork 92 on the other hand, restores the parts 95, 91, 89, 87 and 86 to their neutral position, as soon as the record has swept past the roller 86. The manner in which the above sequence of operations is used to control the setting of the tone arm and stylus at the beginning of the record will be described later.

In the meantime, the record has been carried past the size registering mechanism, and the mechanism for guiding the record onto the spindle of the turntable now comes into operation.

*Record centering mechanism*

The mechanism for guiding the record onto the turntable is illustrated in Figures 1, 4, 6 and 10, together with the control mechanism. Referring now to these figures, the members 9, 10 constituting the runway are supported on two arms 135, 136 respectively, said arms being integral with two sleeve portions 131, 132 pivotally mounted on frame members 1, 2 to rock in a horizontal plane. The two arms 135, 136 are interconnected by a rod 133 connected to two lugs 137, 138 projecting from the sleeve portions 131, 132 of the arms 135, 136. The arrangement of the intercommunications is such that movement of one of the arms 135, 136 causes movement of the other arm in the opposite direction.

Thus, inward movement of one arm will cause a corresponding inward movement of the other arm and vice versa.

The arm 135 has a lug 139 depending therefrom to which there is connected one end of a helical tension spring 134.

The other end of this tension spring is connected to one end of a lever 140 adapted to rock about a pivot 141 (Figures 4 and 6) mounted on cover plate 27² of casing 27. The other end of lever 140 terminates in a roller 142 which bears against a cam 143 mounted on shaft 56. The arrangement of the cam 143, lever 140 and spring 134 is such that the spring 134 always exerts a force drawing the two arms 135, 136 towards each other, but this force is reduced at times determined by the cam 143 since when the roller 142 is cammed out towards the left (Figure 4) the lever 140 is rocked and the tension of spring 134 is increased whilst when the lever 140 is rocked in the opposite direction, the tension is reduced.

The arms 135, 136 at their ends 9', 10' support a pair of forked members 144, 145 which engage collars on shafts 147, 19 projecting rearwardly from the arcuate grippers 11, 12. The shafts 147, 19 are rotatably supported in bearings formed in the frame members 1, 2 so that the grippers 11, 12 are both rotatable and longitudinally movable along an axis indicated by the broken line in Figure 10.

The gripper 11 is arranged so that it can be held in the position shown in Figure 1. The means for effecting this is indicated in Figure 10a and comprises a pair of spring loaded flat faced plungers 147c, 147d which bear against flattened faces 147a and 147b on the shaft 147.

The shaft 19 of gripper 12 (Figure 15) is provided with gear teeth extending along the length of the shaft which mesh with a rack 20 movable longitudinally along its axis. The arrangement is such that the members 19, 20 are always in mesh irrespective of the position of gripper 12.

The two grippers 11 and 12 on their respective shafts 147 and 19 are provided with grooves 11a, 12a along their length, the width of which grooves are slightly greater than the thickness of the thickest record likely to be played. At the mouths of the grooves the grippers are provided with free running rollers $12^2$, $11^2$ respectively for permitting easy entry of the edge of the record into the respective grooves.

The operation of the just described mechanism is as follows: when the arm 14 sweeps the record past the registering device which determines its diameter, cam 143 is rotated to a position in which lever 140 is rocked to reduce the tension of spring 134.

The tension of this spring is now such that when arm 14 causes the record to abut against the rollers at the ends of the grippers 11, 12, the record forces the grippers apart and enters the grooves 11a, 12a. The record, being once centered, is retained in this position by the grippers. At the same time the cam 143 controlling the spring tension is moved to rock the lever 140 in clockwise direction and thereby to increase the tension. The grippers 11, 12 consequently hold the record firmly in position.

The arm 14 continues to move but, as has already been described with reference previously to the transfer mechanism, it is now raised and thus leaves the record. The next operation is to place the record on the turntable.

*Turntable mechanism*

The mechanism for controlling the turntable is illustrated in Figures 1, 11, 12, and 13.

The turntable 8 together with an electric motor (not shown) for driving the turntable and trip mechanism of known type, for automatically stopping the turntable at the end of the playing period and for switching off its motor, is mounted on a platform 148 which is freely pivotally mounted about a shaft 149 supported by brackets 150 depending from cross member 7.

The platform 148 is provided with a downwardly extending adjusting screw 151 which bears against one arm 152 of a cranked lever also pivoted at 149. The other arm 153 of the cranked lever has a link 154 connected thereto, the other end of which is pivotally connected to one end of a second link 155. The other end of link 155 is pivotally connected at 156 to the cover plate $27^2$ of casing 27.

A roller 157 is provided at the juncture of the links 154 and 155, which roller bears on the edge of a cam 158 rotatable with the shaft 56. A spring 159, hooked over and pressing down on the link 155 ensures permanent contact of the roller 157 with cam 158.

In operation, cam 158 bears against the end of arm 154 through roller 157 and causes movement of the arm 152 and of the platform 148 about pivot 149 from a substantially horizontal position (Figure 11) to a substantially vertical position. In order that the cam 158 may be correctly angularly positioned on its shaft to time its operation, it is rotatably adjustable thereon, being secured in its correct position by bolts $158^2$ projecting through a slat in a plate 158' fast on the shaft.

Cam 158 is so cut that the platform reaches a position slightly below true horizontal just after the record has been gripped by the grippers 11, 12 as already described.

The platform is lowered to its vertical position to permit reversal of the record and for discarding a played record, which operations will be referred to later.

It is to be noted that arm 152 is provided with an upturned portion 152a which normally bears against a pair of spring contacts 160, 161 to maintain them closed. If, as will be evident later, the downward movement of the platform is impeded in any way, the platform remains stationary whilst the arm 152 only takes part in the downward movement. Part 152a is thus caused to move away from the contacts permitting them to open as shown in Figure 12. As these contacts are in the main circuit the same is broken and the entire mechanism is stopped.

Reverting to the sequence of operations, the record is now disposed in the grippers immediately above the turntable with the latter in its first substantially horizontal position, and must now be released to drop thereon.

*Record release mechanism*

The mechanism for releasing the record so that it will drop onto the turntable is illustrated in Figures 1 and 10.

As previously explained, the two pivotally mounted arms 135, 136 are coupled by link 133 in a manner such that if one arm is moved the other is moved a corresponding amount in the opposite direction. The link 133 is connected to the sleeve portion 132 integral with arm 136 by means of an arm 138 which, together with a second arm 139 rigid therewith, forms a bell crank lever. The sleeve portion 132 is rotatably mounted on a spindle (not shown) depending from a lug projecting laterally from frame member 2 in a similar manner as lug 1a projects from frame member 1.

The end of arm 139 is connected through a system of push rods 126, 129 and to rocker arms 127, 128 a T shaped member 125 abutting against the one or the other of two cams 119, 120 mounted on shaft 121. The T member 125 is pivotally mounted at 125' on any convenient part of the apparatus.

The shaft 121 is movable axially by the parts 121', 124', $124^2$ in a manner such as to bring either one or the other of the cams 119, 120 into contact with the T member 125 in a manner and for a purpose to be hereinafter described. At present it will be sufficient to point out that both cams have equal camming portions 119a, 120a by means of which the ends 9', 10' of arms 135 and 136 are caused to pivot away from each other thereby separating the grippers 11, 12 and permitting the record to drop onto the turntable which at this moment is rotating.

In the meantime, eccentric 57 has moved to a position such that rod 60 is moving back into the socket 61 with the result that shaft 62 is rotated in a direction opposite to that indicated by the arrow in Figure 7 carrying with it the arm 14. At the moment when the shaft 62 starts its return rotation it is lifted by a T member 182 operated by cam 84 and acting upwardly upon collar 82. The shaft 62 by being lifted ensures that the pin 15' on arm 15 passes over the record being played and comes to rest in its neutral position. By this time, cam 84 has rotated sufficiently to permit shaft 62 to be lowered and pin 15' becomes ready to once more engage the top of spindle 22 in preparation for the next sequence of operations which feeds the topmost record thereto.

Reverting to the main sequence of operations, it will be remembered that the record has been deposited on the rotating turntable and is waiting for the latter to be raised to its final horizontal position which brings the stylus onto the first playing grooves.

Tone arm control

The movements of the tone arm and stylus are controlled by the mechanism shown in Figures 1, 8, 9 and 14.

Referring to these figures, it will be remembered that a plate 100 has been set to one of two positions according to the size of the record.

The tone arm 17 is pivoted at 17' to a bracket 163 rotatably mounted on a vertical shaft 115 journalled in the member 2 to permit the tone arm 17 to swing in a substantially horizontal plane.

Depending from the tone arm 17 is a short rod 164 passing through a slot 165 (Figure 9) in a plate 166 pivoted on vertical shaft 115 and having a sharp nose portion 167. The rod 164 abuts one end of a lever 168 pivoted at 169 on frame member 2. This lever is connected by a rod 170 to a bell crank lever 171 adapted to be rocked by cam 172 through lever system 173, 174.

In operation, the cam 172 in rotating causes rod 170 to move to the right as viewed in Figure 14 and rock lever 168 in a counter clockwise direction carrying with it the tone arm 17. In the course of this movement, the depending rod 164 slides along the edge of plate 100 and then encounters a substantially horizontal arm 310 pivoted on vertical shaft 115. The arm 310 is first displaced in counter-clockwise direction (see Fig. 9a), but as soon as cam 172 assumes a position causing lever 168 to recede from rod 164, the arm 310 and the rod 164 carry out a movement in clockwise direction under the influence of a spring 311. This latter movement continues until the depending rod 164, whilst the tone arm is hanging down about its pivot 17', abuts against the nose of the plate 100 in its adjusted position (Figure 9a). When the rod 164 is checked by the plate 100, the inner end of an adjusting screw 312 abuts the projection 118 on the plate 100 so that now the rod is only subjected to the influence of a weak spring 313, the strength of which can be adjusted by means of the screw 312. The plate 100, in correspondence to its adjustment by the record registering mechanism hereinbefore described and depending upon the size of the record to be played, defines the position up to which the rod 164 and tone arm 17 are moved by the spring actuated arm 310 before the stylus (not shown) contacts the record.

Referring now to Figure 11, an inspection of cam 158 will show that it comprises a part 175 spaced further radially from the central axis about which the cam rotates than any other part thereof. When roller 157 rides on this part 175, as it does at this point in the sequence of operations, the platform, already raised to its initial substantially horizontal position when the stylus engages the smooth part of the record, is further raised by a slight additional movement of the cranked lever 152, 153 to bring the platform 148 to its maximum height when the stylus enters the first groove of the record. During the final movement of the turntable from its first horizontal position to its final horizontal position, it rocks the tone arm upwardly from its hanging position to its playing position and the resulting traverse of the rod 164 along the curve of the spring 313 biases the tone arm inwardly to bring the stylus into engagement with the first sound groove. At this time the rod 164 is freed from the plate 100. Consequently, the tone arm is perfectly free to traverse across the record and play it. When the record has been played and the turntable sinks, the rod 164 drops back into engagement with the plate 100 and, during the next cycle of the control assembly, is swept around the edge thereof in being carried to its outermost limit position by the arm 168. When, in the course of its upward movement, the turntable has reached its final horizontal position, the circuit of the main driving motor 18 is broken by means of a switch 290 controlled by cam 190 on shaft 56 (see Fig. 16), and the apparatus remains in this state until the record has been played. At the end of each playing period, the motor 18 is automatically started again by establishing a temporary shunt circuit in the following manner. As the tone arm is guided inwardly beyond the innermost sound groove of a record, the nose-shaped part 167 (Figure 9) engages and displaces a weighted block 176 mounted on lever 177, whereby a control arm $177^2$ connected with lever 177 causes a movable contact element 177' to bridge two spaced contact pieces $177^3$ (see Fig. 16). As soon as motor 18 and cam shaft 56 start to rotate, the main circuit is re-established by cam 190 closing switch 290.

The lever 177 is pivotally supported on a bracket 179 fixed to platform 148. To the lower surface of the bracket 179, there is pivoted a cranked lever 178, the lower end of which is connected to a rod 180 swivelled at 181 on cross member 7. When the turntable 8 is swung down to its substantially vertical position, due to the eccentricity of its pivotal axis with respect to the pivotal axis of the rod 180, the latter pulls the lower end of the cranked lever 178 and rocks the free upper end 182 of said lever in a clockwise direction thereby rotating the lever 177 so as to reset the block 176 to its initial position and to open the contacts $177^3$, $177^1$.

At the end of the record a trip mechanism of known type and, therefore not described nor shown, is actuated so as to operate the switch to open the circuit of the turntable motor and to close the circuit of motor 18.

The platform 148 is lowered by means of cam 158. As the platform begins to descend the record reversing mechanism is operated for enabling the other side of the record to be played.

Record reversing mechanism

The mechanism for reversing the record is illustrated in Figures 1, 10 and 15. Referring first to Figure 10, the record before being rotated must be engaged in grippers 11, 12. This is effected due to the T member 125 passing beyond the protrusion 183 on the cam 120, when the grippers 11, 12 are permitted to move inwards to grip the record.

Immediately thereafter, at which time the turntable has swung down, cam 184 (Figure 15) engages crank lever 185 to rock it about its pivot in a counterclockwise direction whereby rod 186 is pushed to the left as viewed in this figure.

This rod, in moving, compresses spring 187 and at the same time pushes the rod 20' having a racked end 20 engaging the teeth on shaft 19 which is consequently rotated together with gripper 12.

The rack 20 is conveniently formed as a spiral thread on the rod 20'. The latter is arranged for axial adjustment in its bearing 20² so as to permit accurate positioning of the gripper 12 before and after turning. The opposite end of the rod 20' is threaded as at 20³, which portion engages the projecting lug of the part 186' on the end of the rod 186. The rod 20' is locked in its adjusted position by lock nuts 20⁴.

The movement of the rod 186 in the direction towards the right, as seen in Figure 15, is limited by an adjustable stop-screw 300, extending through a lug 301 on the member 2 and locked in its adjusted position by a lock nut 302.

Since the record is at this time held between the grippers, both are rotated. During this operation the arm 14 is swung from its neutral position across to the turntable as before, but as the shaft 62 remains raised no transfer of records is effected from the feed mechanism to the turntable. The movement of the arm 14 is timed to take place after the turning of the record is complete. By the time the record has been reversed, the turntable is once more raised to its first substantially horizontal position by cam 158. The grippers are separated to permit the record to drop onto the turntable, the turntable is further raised and the record played as before.

If the record is to be discharged after one side has been played instead of being reversed, the cam 119 is brought into operative position instead of cam 120 by axial movement of the shaft 121 by rotation of hand operated shaft 124, as already explained. The T member 125 now engages the cam 119.

At the end of the playing time of the record, the grippers are prevented from moving inwardly to grip the record. Thus, as the table descends, the record is slid into a discard magazine (Figure 1) indicated by the general reference character D. The record remains on the table for about two thirds of its downward travel when it is engaged by the arms 21, 21' and leaves the table to drop edge on onto rubber stops 320. Immediately after the record has been dropped into the tray, rotation of disc 190 on shaft 56 causes arms 21 to be swung towards a back plate 191 carrying with it the discarded record and stacking it on end against plate 191. The arms 21 and 21' are mounted on a cross-bar 21² carried by levers 192, which levers have rubber covered projections 321 extending outwardly to lie between the rubber covered limbs 322, 323 of pivoted bifurcated members 324 fast on shaft 325 on which is mounted crank arm 193. Thus, when the eccentric 190' acting through rod 194 rocks member 324, the arms 21, 21' are as has been said moved towards plate 191. The levers 192 are under control of an over-centre spring, not shown, and accordingly snap over in the one direction or the other but silently due to the rubber cushioning.

To remove the records from the discard magazine the plate 191 is swung back about pivot 195 (Figure 2).

This motion also causes a pair of contacts 196 to be opened and thereby open the main circuit for preventing any possible operation of the mechanism when the discard magazine is in a position other than in that for receiving discarded records.

Should a record lie in the discard magazine in a manner such as to lie in the path of the downwardly moving platform 148, the platform will rest on the record but the cam 158 will continue to rotate until contacts 160, 161 separate whereupon the main circuit is again opened and the whole mechanism brought to a standstill. In this manner risk of breaking a record is reduced.

*Reject*

To reject a record that is being played to bring about the next cycle, i. e. the discard or reversal of the record, it is only necessary to close the circuit to the main motor 18 which may be done by remote control or to trip the automatic stop device.

The circuit diagram by means of which the motor 18 is controlled is illustrated in Figure 16 wherein the various safety switches previously referred to are shown schematically.

The terminals 197, 198 are connected to the house electric mains. A master switch 199 closes a circuit from the mains terminal 198 over the stationary winding 204 of induction motor 18, turn-table safety switch 160, 161, cam controlled switch 290 or shunt switch 177³, 177¹, rejection tray safety switch 196, to the main 197, and simultaneously, a parallel circuit, including the primary P of a transformer 200. The secondary S of the transformer 200 is arranged in a circuit which includes the winding 201¹ of a relay 201, the feed spindle 22 and the arms 14, 15. When the circuit of the secondary winding S is closed over spindle 22 and the arms, the armature 201² of the relay 201 and two movable contacts 201³ and 201⁴ are moved towards the right in Fig. 16, whilst when the circuit is broken in the manner hereinbefore described, the armature 201² and the contacts 201³ and 201⁴ will be operated in the opposite direction by means of springs 201a and 201b. In the first of the said two positions, the movable contacts 201³ and 201⁴ close a third parallel circuit over contacts 202, 203, current being fed from the mains terminal 197, rejection tray safety switch 196, cam controlled switch 290 or shunt switch 177³, 177¹, turntable safety switch 161, 160, contacts 201³, 203, 207, rotor winding 206 of motor 18, contacts 205, 202, 201⁴, and switch 199 to main terminal 198.

In these conditions the motor will operate in one direction. When the circuit including spindle 22 is broken the armature 201² of the relay 200 and the movable contacts 201³, 201⁴ will move towards the left in Fig. 16, whereby the above described rotor circuit is opened and a reverse rotor circuit is closed, feeding current from the main terminal 197 over switches 196; 290 or 177³, 177¹; 161, 160; contacts 201³; 205 through rotor winding 206 and over contacts 207, 201⁴ and switch 199 to terminal 198. This will cause a reversal of the current in the rotor 206 causing the motor 18 to reverse.

I claim:

1. In a phonograph having a frame and supported within said frame a turn-table and a substantially horizontal support table for a stack of records to be played, the combination of a device for transferring records from said support table to said turn-table, comprising a substantially horizontal main feed arm pivoted to said frame so as to project across an imaginary line connecting the center of said support table to that of the turn-table and in a plane above said line, a rotatable spindle depending from the free end of said main feed arm, an auxiliary horizontal arm disposed at the lower end of said spindle in a direction substantially opposite to that of said main arm, the free end of said auxiliary arm projecting to said imaginary line, cam means for rotating said main feed arm, means for rotating said depending spindle and auxiliary arm in dependence upon the rotation of the main feed arm, to cause displacement of the free end of said auxiliary arm substantially along said imaginary line, and means provided at the free end of said auxiliary arm to engage the uppermost record on said support table, whereby said record is transferred to the turntable when said horizontal arms swing towards the latter.

2. A phonograph, as claimed in claim 1, comprising further means to elevate said main feed arm during predetermined periods of its rotation.

3. A phonograph, as claimed in claim 1, in which said means for rotating said depending spindle comprise a pinion rigid on the upper portion of said spindle, a draw rod having one end pivoted to said frame at a point eccentric of the pivot axis of said main feed arm, and a rack disposed longitudinally and slidably with respect to said main arm and in permanent mesh with said pinion, said rack being pivotally connected with the free end of said draw rod.

4. In a phonograph having a frame and supported within said frame a turntable and a substantially horizontal support table for a stack of records to be played, the combination of a device for transferring records from said support table to said turntable, said device comprising a vertical shaft pivoted to said frame, a substantially horizontal main feed arm projecting from said shaft across an imaginary line connecting the center of said support table to that of the turntable and in a plane above said line, a rotatable spindle depending from the free end of said main feed arm, an auxiliary horizontal arm disposed at the lower end of said spindle in a direction substantially opposite to that of said main arm, the free end of said auxiliary arm projecting to said imaginary line, cam means for rotating said vertical shaft and main feed arm, means for rotating said depending spindle and auxiliary arm in dependence upon the rotation of the main feed arm to cause displacement of the free end of said auxiliary arm substantially along said imaginary line, and means provided at the free end of said auxiliary arm to engage the uppermost record on said support table, whereby said record is transferred to the turntable when said horizontal arms swing towards the latter.

5. A phonograph, as claimed in claim 4, comprising further cam means to elevate said vertical shaft and feed arms during the return movement of the latter from the turntable to the support table.

6. A phonograph, as claimed in claim 4, comprising further cam means adjustable to operative and inoperative positions for maintaining said vertical shaft and feed arms in elevated position during each second transfer cycle, and a hand lever for adjusting said cam means at will to its operative or inoperative position.

7. A phonograph, as claimed in claim 4, in which said main feed arm is rotatably mounted on said vertical shaft, the latter carrying means to positively transmit its rotation in one direction to the main feed arm for swinging the same towards the turntable and resilient means connecting said vertical shaft and main feed arm to yieldably transmit the shaft's rotation in the opposite direction to the main arm.

8. A phonograph, as claimed in claim 4, in which said main feed arm is rotatably mounted on said vertical shaft and comprising further abutments on said vertical shaft and main feed arm to positively transmit the rotation of the shaft in one direction to the feed arm, resilient means connecting said vertical shaft and main feed arm to yieldably transmit the shaft's rotation in the opposite direction to the main arm, and stop means provided on said main arm for cooperation with said auxiliary arm when the free end of the latter has reached a predetermined position corresponding to the center of said support table, so as to prevent any further movements of both arms in said last mentioned direction, regardless of a continued rotation of said shaft.

9. A phonograph, as claimed in claim 4, in which said main feed arm is hinged to said vertical shaft, the latter carrying means to prevent said arm from dropping below a predetermined horizontal position, said means for rotating said depending spindle comprising a pinion rigid on the upper portion of said spindle, a draw rod having one end pivoted to said frame at a point eccentric of said vertical shaft, and a rack disposed longitudinally and slidably with respect to said main arm in permanent mesh with said pinion and pivotally connected with the free end of said draw rod, said main feed arm carrying a stop against which said rack abuts when, during rotation of the main arm in its horizontal position towards the turntable, the free end of the auxiliary arm has reached a position corresponding to the center of the turntable, whereby continued rotation of said main arm in the same direction causes said rack to tilt said main arm upwardly thereby disengaging the free end of the auxiliary arm from the transferred record.

10. In a phonograph having a turntable and a substantially horizontal support table for a stack of records to be played, the combination of a magazine pin projecting through said support table to penetrate the center holes of the records stacked on said support table and having a top portion to serve as an electric contact, a hinged switch element having a contact finger to project into the center hole of the uppermost record on said support table and of a length less than the thickness of the thinnest record to be played, a collar on said switch element to rest on the surface of said uppermost record, an assembly of transmission elements to axially lift said support table relative to said magazine pin for releasing the uppermost record from the latter, a reversible rotary driving element, a rotatable coupling element between said driving element and said lifting assembly, resilient means to transmit rotation of said driving element in one direction to said coupling element and lifting assembly, resilient means to prevent said coupling element and lifting assembly from rotation in the opposite direction, a relay to reverse the rotation of said driving element, and a control circuit for said relay including said hinged switch contact finger and said magazine pin.

11. A phonograph, as claimed in claim 10, in which said driving element comprises a reversible induction motor, and said relay is arranged to reverse the rotor circuit of said motor.

12. A phonograph, as claimed in claim 10, comprising further means for transferring the uppermost record from said support table to said turntable, and a unidirectional coupling between said driving element and said transfer means to actuate the latter when said driving element rotates in a direction opposite to that operating said lifting assembly.

13. In a phonograph, having a tone arm carrying a stylus, a turntable, a support for a stack of records to be played, means to transfer the uppermost record from said support to said turntable, means to bring said stylus and turntable at the beginning of each playing period in operative position with respect to one another, and means to return the tone arm after each playing period to a position beyond the outermost position to be assumed by the tone arm at the beginning of a playing period, the combination of a device for determining the contact position of the tone arm in dependence upon the size of the record to be played, said device comprising a movable abutment projecting laterally into the transfer path of the records and being adapted to be more or less displaced by the rim of the records according to the size of the latter resilient means arranged to cooperate with the tone arm when the stylus is in its inoperative position with respect to the turntable to swing the arm in a direction opposite to that of said return movement, an adjustable stop to limit said countermovement of the resilient means and tone arm thereby positioning the latter for proper contact of the stylus with the transferred record, and means to transmit displacements of said movable abutment to said adjustable stop, said tone arm being released from said stop and resilient means, when said stylus and turntable assume operative positions with respect to one another.

14. A phonograph, having a frame, a turntable pivotally supported on said frame, cam means to alternately swing said turntable downwardly to a substantially vertical position and upwardly to a substantially horizontal position, a substantially horizontal support table carried in said frame for a stack of records to be played, means to transfer the uppermost record from said support table to said turntable and to deposit it on the latter while said turntable approaches its horizontal position, a vertical shaft fixed to said frame, a tone arm pivotally supported on said vertical shaft for horizontal rotation and hinged thereto for vertical tilting, means to limit the drop of said tone arm, a stylus at the free end of said arm, a guide rod depending from said tone arm and rigid therewith, an adjustable horizontal guide plate pivoted to said shaft in a plane below said tone arm, said plate having a nose portion to cooperate with said depending rod, cam controlled means engaging said depending rod after each playing period to return said tone arm to a position beyond the outermost position to be assumed by the arm at the beginning of a playing period whereby said depending rod slides along the edge of said guide plate and past the nose portion of the latter, a substantially horizontal positioning arm pivoted on said vertical shaft to cooperate with said depending rod, resilient means urging said arm into engagement with said depending rod to displace the tone arm upon recession of said cam operated return means in a direction opposite to that of the return movement until the depending rod abuts against said nose on said guide plate, a spring carried on the free end of said positioning arm and being curved towards the turntable, a movable abutment projecting laterally into the transfer path of the record to be relatively displaced by the rim of the passing records according to the size of the latter, links connecting said movable abutment with an adjusting member for said guide plate, and cam controlled means to adjust said guide plate in accordance with the position assumed by said adjusting member, said turntable upon reaching its final horizontal position being adapted to lift said stylus, tone arm and depending rod to disengage the latter from the nose on said guide plate whereby said rod is biased by said spring towards the first sound groove on the record to be played and said tone arm becomes free to traverse said records.

15. In a phonograph having a tone arm carrying a stylus, a turntable, a support for a stack of records to be played, means to transfer the uppermost record from said support to said turntable, and means to bring said stylus and turntable at the beginning of each playing period in operative position with respect to one another, the combination of a device for determining the contact position of the tone arm in dependence upon the size of the record to be played, said device comprising a movable abutment projecting laterally into the transfer path of the record and being adapted to be more or less displaced by the rim of the records according to the size of the latter, an adjustable stop disposed to cooperate with the tone arm when the stylus is in its inoperative position with respect to the turntable, means to transmit displacements of said movable abutment to said adjustable stop to adjust the latter, and resilient means urging said tone arm into engagement with said adjusting stop, said tone arm being released from said stop and resilient means when said stylus and turntable assume operative positions with respect to one another, and further auxiliary resilient means to slightly bias the tone arm and stylus towards the first sound groove on the record to be played, when said tone arm is released from said adjusting stop and first mentioned resilient means upon said stylus coming into operative position with respect to said turntable.

ALBERT EDWIN BOWYER-LOWE.